United States Patent [19]

Beckert et al.

[11] 3,940,298

[45] Feb. 24, 1976

[54] THERMAL LASER PUMPED WITH HIGH NITROGEN CONTENT PROPELLANTS

[75] Inventors: Werner F. Beckert, Las Vegas, Nev.; Ottmar H. Dengel, Front Royal, Va.

[73] Assignee: The United States of America as represented by the Secretary of the Navy, Washington, D.C.

[22] Filed: Dec. 6, 1974

[21] Appl. No.: 530,258

[52] U.S. Cl. ............... 149/92; 149/19.1; 260/248 A; 260/308 D; 260/644; 331/94.5 G
[51] Int. Cl.² C06B 25/34; C06B 45/10; C07C 76/02; H01S 3/00
[58] Field of Search....................... 149/92, 91, 19.1; 252/301.3 R; 260/248 A, 308 D, 644, 645; 331/94.5

[56] References Cited
UNITED STATES PATENTS

| | | | |
|---|---|---|---|
| 2,480,852 | 9/1949 | Hale | 149/92 |
| 3,041,337 | 6/1962 | Frankel | 149/92 |
| 3,111,524 | 11/1963 | Wiley | 149/92 |
| 3,173,921 | 3/1965 | Einberg | 149/92 |
| 3,375,230 | 3/1968 | Oja | 260/67.6 |
| 3,543,179 | 11/1970 | Wilson | 331/94.5 |
| 3,560,876 | 2/1971 | Airey | 331/94.5 |
| 3,614,660 | 10/1971 | Ultee | 252/301.2 R |
| 3,618,526 | 11/1971 | Baker | 331/94.5 |
| 3,716,550 | 2/1973 | Gilligan | 260/308 D |
| 3,773,947 | 11/1973 | Boyars | 149/35 |

OTHER PUBLICATIONS

Russell, "Gasdynamic Lasers", Astronautics & Aeronautics, June 1975, pp. 50–55.

*Primary Examiner*—Richard D. Lovering
*Assistant Examiner*—Donald P. Walsh
*Attorney, Agent, or Firm*—R. S. Sciascia; J. A. Cooke

[57] ABSTRACT

Thermal lasers use aliphatic polynitro compounds and polynitroamines as oxidizers and tetrazoles, ditetrazolyls, tetrazines, triazines and guanidines as fuel.

17 Claims, No Drawings

THERMAL LASER PUMPED WITH HIGH NITROGEN CONTENT PROPELLANTS

BACKGROUND OF THE INVENTION

This invention relates to lasers and more specifically to thermal lasers (gasdynamic lasers).

Laser is an acronym for light amplification by stimulated emission of radiation. A laser produces a beam in the spectral region broadly defined as optical. The laser beam is coherent electromagnetic radiation having a particular well defined frequency. Ordinary light is incoherent while lasers are coherent. Because of coherence, lasers have extremely small divergence and are highly directional. Also enormous power is generated in a very small wavelength range. This power is focusable on a spot having a diameter of the wavelength itself, and is capable of producing from a 50 kilowatt outburst a radiant power density of $10^{12}$ watts per square centimeter which is about $10^8$ times the power density at the surface of the sun. Such power has many uses, such as testing materials, welding, drilling or military applications. Because of the power produced, much research has been directed to the laser field.

Electric discharge, gas dynamic, and chemical lasers are known types of gas lasers. The basic physical process common to them is the competition between stimulated emission and absorption of monochromatic radiation, where the radiation energy corresponds to the difference between two distinct energy levels of an atomic or molecular system. In chemical lasers, the products of highly energetic chemical reactions are formed directly in vibrationally excited states with the upper levels preferentially populated. In gas dynamic lasers, an initially hot gas in thermodynamic equilibrium is rapidly expanded through a supersonic nozzle, and an inversion is formed by differential relaxation processes in the nonequilibrium nozzle flow. In electric discharge lasers, the upper energy level is preferentially populated by collisions with electrons within a gas mixture energized by an electric field.

The laser effect in electric discharge lasers is produced by funneling the gas through an electric field to achieve the desired excited level and produce a laser beam. High energy levels are required to excite the gas to laser producing levels.

Chemical lasers depend on a carefully monitored flow of gases which intersect at precisely the right point at the precise angle with the desired velocity at the right temperature to react to produce the desired laser characteristics. These parameters are only a few of the parameters which must be controlled in order for a chemical laser to function. Controls on each of the parameters are highly complicated in themselves and must be integrated with other complicated controls to produce the laser beam.

Simplest of the three types of lasers to use is the gas dynamic laser. This laser produces the laser beam by means of a rapid gas expansion. This type of laser is simplest because the reactants are generally solid or liquid, and easier to handle and store. However, finding reactants to produce laser action is difficult.

Laser action occurs when two conditions are met: (1) population inversion is achieved and (2) avalanche process of photon amplification is established in a suitable cavity. Population inversion is established in an atomic or molecular system having at least one ground level, and at least two excited levels wherein one of the excited levels has a longer spontaneous emission life time than the other excited level. Inversion permits stimulated emission to exceed absorption which results in photon amplification. A more thorough discussion of laser action is found in U.S. Pat. No. 3,543,179 to Wilson incorporated herein by reference.

In spite of the difficulties involved in achieving a laser beam, the power of the laser beam renders the field highly fertile for research. Some of the areas most fertile are those which simplify the generation of a laser beam. The above mentioned electrical discharge lasers, chemical lasers, and gas dynamic lasers are highly complex means of generating the desired laser beam. Efforts in the gas dynamic laser field are made because of the simple operation. Chemical gas generation is a well-known method of simplifying a gas process. The problem now becomes selecting an appropriate fuel or chemical which produces the proper gas for rapid thermal expansion when reacted or burned.

It is possible to pump gas dynamic lasers by use of hydrocarbon/air mixtures. These mixtures are ignited in a combustion chamber and then allowed to expand through a supersonic nozzle so that population inversion occurs. Theoretically, the efficiency of the laser increases with increasing combustion pressure and temperature, and with increasing expansion ratio. The combustion products must contain a high percentage of nitrogen, a minimum percentage of carbon dioxide, and some percentage of water vapor. In addition, the combustion products should not contain any solid particles or highly corrosive gases; however, gases such as carbon monoxide, oxygen and small amounts of hydrogen chloride do not seem to be detrimental to the optical gain. These requirements rule out the use of conventional explosives such as trinitrotoluene, nitrocellulose, and the like, as well as double-base and composite propellants. For military applications, lasers must meet rigid requirements of safety, storage, handling, non-toxicity, etc.

Additionally, for military applications, solid propellants are considered to generate the laser gases mentioned above. The propellant would consist of only the elements carbon, hydrogen, oxygen and nitrogen. However, compounds that can produce high nitrogen, low carbon dioxide and water upon burning are usually unstable, toxic, and hard to store, especially in large quantities. They also have high combustion temperatures that are difficult to use with laser equipment.

SUMMARY OF THE INVENTION

Therefore, it is an object of this invention to provide a composition to assist in generating a laser beam.

Also it is an object of this invention to provide a composition suitable for use in a thermally pumped laser.

It is a further object of this invention to provide a composition suitable for use in pumping lasers.

It is a still further object of this invention to provide a simplified method for generating a laser beam.

Another object of this invention is to provide a fuel composition suitable for generating a laser beam.

These and other objects of the invention are met by providing tetrazoles, tetrazines, triazines, guanidines or mixtures thereof in combination with an oxidizer for use in a gas dynamic chemical laser.

DESCRIPTION OF THE PREFERRED EMBODIMENTS

Fuels suitable for pumping a thermal laser are tetrazoles, ditetrazolyls, tetrazines, triazines, guanidines or mixtures thereof. Oxidizers suitable for use with the desired fuels must have a minimum carbon and hydrogen content and a maximum nitrogen and oxygen content. This combination of fuels and oxidizers provides the desired combustion gases rich in nitrogen, and moderate in both carbon dioxide and water vapor. Nitrogen is preferably present in the combustion products on a mole percent basis at 44 to 70 percent. Carbon dioxide is preferably present in the combustion products on a mole percent basis at 17 to 30 percent. Water vapor is preferably present in the combustion products on a mole percent basis at 0 to 30 percent.

Suitable percentages within the ranges set forth vary according to the composition used. The combustion products of the fuel and oxidizer combinations have the desired gas ratios.

Suitable tetrazoles for the purpose of providing fuels in this invention have the general formula:

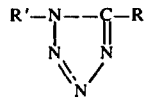

The substituents R and R' are selected from the group consisting of $-H, -N_3, -CH(NO_2)_2, -CN, -NH_2$, and $-NHNO_2$. Other substituents are also feasible. Table I lists the name and formula of especially suitable compounds together with their elemental weight ratios. However, disubstituted tetrazoles are also feasible. These fuels and other fuels contain nitrogen in the 45 to 90 percent range; carbon in the 5 to 25 percent range; hydrogen in the 0.5 to 5 percent range; and oxygen in the 0 to 40 percent range to produce the desired laser gas mixture. Tetrazoles and all other fuels listed herein are manufactured in any suitable fashion exemplified by U.S. Pat. No. 3,716,550 to Gilligan et al. incorporated herein by reference.

TABLE I

| Compound name | N:C:H:O (Weight ratios) | Structural formula |
|---|---|---|
| tetrazole | 80:17.1:2.9:0 | $H-N-C-H$ ring |
| 5-azidotetrazole | 88.3:10.8:0.9:0 | $H-N-C-N_3$ ring |
| 5-dinitromethyl tetrazole | 48.3:13.8:1.1:36.8 | $H-N-C-CH_1(NO_2)_2$ ring |
| 5-cyanotetrazole | 73.7:25.3:1.0:0 | $H-N-C-CN$ ring |
| 5-amino tetrazole | 82.4:14.1:3.5:0 | $H-N-C-NH_2$ ring |
| 5-nitroamino tetrazole | 64.6:9.2:1.5:24.6 | $H-N-C-NHNO_2$ ring |

Suitable ditetrazolyl derivatives for use as fuels in this invention have the general structural formula:

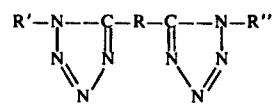

Many substituents are feasible for R, R', and R''. The substituent R can be exemplified by $-N=N-NH-NH-N=N-$, $-NH-$, $-N=N-NH-$, or $-NH-NH-$. The substituents R' and R'' are exemplified by $-H$. Table II lists names and structural formulas for ditetrazolyl derivatives.

TABLE II

| Compound names | N:C:H (weight ratios) | Compound structural formula |
|---|---|---|
| ditetrazolylamine | 82.3:15.7:2.0 | $H-N-C-NH-C-N-H$ with two rings |
| 1,3 ditetrazolyltriazene | 85.1:13.3:1.6 | $H-N-C-N=N-NH-C-N-H$ with two rings |

TABLE II-continued

| Compound names | N:C:H (weight ratios) | Compound structural formula |
| --- | --- | --- |
| 5,5'-hydrazotetrazole | 83.3:14.3:2.4 | |
| 1,6-ditetrazolylhexazadiene (1,5) | 87.5:10.7:1.7 | |

Suitable tetrazine fuels for use in this invention have the general structural formula:

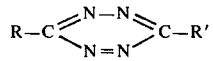

R and R' may be the same or different and be any suitable substituent. It is suitable for both R and R' to be $NH_2$ and form diaminotetrazine (N:C:H = 75.0:21.4:3.6) or for both R and R' to be $-NHNH_2$ and form dihydrazinotetrazine (N:C:H = 78.9:16.9:4.2).

Suitable triazine fuels for use in this invention have the general structural formula:

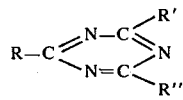

R, R', and R" may be the same or different, and be any suitable substituent. For example R, R', and R" as $-N_3$ form cyanuric acid triazide (N:C = 82.4:17.6).

Suitable guanidine fuels for use in this invention have the general structural formula:

R, R', and R" may be any suitable substituent and may be the same or different. For example when R is $-NH-NO_2$, and R' and R" are $-H$, the compound is nitroaminoguanidine (N:C:H:O = 58.8:10.1:4.2:26.9).

To achieve the desired ratio of nitrogen, carbon dioxide, and water vapor in the combustion products of the fuels described above, an oxidizer having a minimum of carbon and hydrogen, and a maximum of oxygen and nitrogen is required. Suitable oxidizers include high-energy aliphatic polynitro compounds including by way of example only tetranitromethane having an atomic formula of $CN_4O_8$, trinitromethane having an atomic formula of $CHN_3O_6$, and hexanitroethane having an atomic formula of $C_2N_6O_{12}$. Polynitroamines are also suitable oxidizers. An example is tetranitroethylenediamine having an atomic formula of $C_2H_4O_8N_6$. The weight ratios of N:C:H:O are shown in Table III.

TABLE III

| Oxidizer | N:C:H:O (weight ratios) |
| --- | --- |
| tetranitromethane | 28.6:6.1:0:65.3 |
| trinitromethane | 27.8:7.9:0.7:63.6 |
| hexanitroethane | 28:8:0:64 |
| tetranitroethylenediamine | 35:10:1.7:53.3 |

Thus it is seen that a suitable oxidizer has 25 to 40 mole percent nitrogen, 5 to 15 mole percent carbon, 0 to 2 mole percent hydrogen; and 50 to 70 mole percent oxygen.

Relative amounts of fuel to oxidizer ratios used to achieve the desired combustion products and pump a thermal laser are stoichiometric. Gas ratios vary with the temperature of the reaction. At high temperatures above about 1000°C, carbon dioxide is in equilibrium with carbon monoxide and oxygen.

The combination of oxidizers and fuels herein set forth permits formulation of a charge which, after combustion, can be used to pump a thermal laser via expansion of the combustion gases. No air and, therefore, no pressurizing equipment are necessary; the system is ready to fire immediately on demand. Charges can be fired in rapid succession when a revolver or machine gun type arrangement is used. Firing of the charges is initiated by any standard means, e.g., blasting cap. The charge is formed either with or without a binder. Mechanical stability may be inherent from the fuel and oxidizer, or a binder may provide the stability. Suitable binders are listed in U.S. Pat. No. 3,375,230 to Oja et al. incorporated herein by reference. Depending on compatibility and physical condition of the ingredients, the charge can be premixed or mixed (injected) inside the combustion chamber.

The combustion products are then expanded through a supersonic nozzle, such as that described in U.S. Pat. No. 3,560,876 to Airey incorporated herein by reference, in order to produce the laser beam. Use of a nozzle usually requires that the combustion products be substantially gaseous. Modification of the laser producing system is required if solid products are part of the combustion gases.

Compatibility tests between the fuels and oxidizers are standardly run. These tests are required because of the explosive nature and sensitivity of some compounds and mixtures thereof. In this manner, the safety of fuel and oxidizer combinations is determined.

Solid products could be removed from combustion gases by expanding the gases through a combination of structurally reinforced filters instead of a nozzle. This allows the use of other kinds and combinations of fuels and oxidizers. Examples are standard gas-generating pyrotechnic compositions containing alkali metal azides and/or high-nitrogen organic compounds, such as cyano- or aminotetrazoles, as additional nitrogen sources.

The following example is intended to illustrate the invention without unduly limiting the invention. All percentages are by mole percent unless otherwise specified.

EXAMPLE 1.7 grams of 5-azidotetrazole fuel are suspended in heptane and the resulting suspension is stirred. While stirring occurs, 1.5 grams of hexanitroethane oxidizer are added to the suspension. The suspension is allowed to settle. The excess heptane is decanted. The wet settled suspension is transferred to a polytetrafluoroethylene lined metal container. The remaining heptane is evaporated from the suspension under vacuum, thereby permitting recovery of the intimate mixture of the fuel and oxidizer. The mixture is placed in the combustion chamber of a laser. Reaction is initiated with an electric match. The mixture, on burning, forms combustion gases consisting of about 67 mole percent $N_2$, 25 mole percent $CO_2$, and 8 mole percent $H_2O$. These gases are expanded through a standard nozzle. Stored energy is extracted as a laser pulse by excitation with a small laser beam.

Obviously numerous modifications and variations of the present invention are possible in light of the above teachings. It is therefore to be understood that, within the scope of the appended claims, the invention may be practiced otherwise than as specifically described.

What is claimed as new and desired to be secured by Letters Patent of the United States is:

1. In a method of pumping thermal lasers comprising:
   a. combusting a fuel and an oxidizer and (b) expanding the combustion products through a supersonic nozzle to produce a laser effect, the improvement wherein (1) said fuel comprises at least one selected from the group consisting of a tetrazole derivative, a ditetrazolyl derivative, a tetrazine derivative, a triazine derivative and a guanidine derivative, (2) said oxidizer comprises at least one selected from the group consisting of a high-energy aliphatic polynitro compound and a polynitroamine compound.
2. The method of claim 1 wherein the polynitroamine compound is tetranitroethylene diamine.
3. The method of claim 1 wherein the aliphatic polynitro compound is selected from the group consisting of tetranitromethane, trinitromethane, and hexanitroethane.
4. The method of claim 1 wherein the tetrazole derivative is selected from the group consisting of tetrazole, 5-azidotetrazole, 5-dinitromethyl tetrazole, 5-cyanotetrazole, 5-aminotetrazole, and 5-nitraminotetrazole.
5. The method of claim 1 wherein the ditetrazolyl derivative has the following structural formula

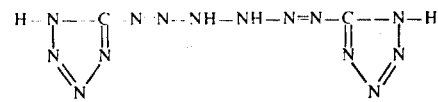

6. The method of claim 1 wherein the ditetrazolyl derivative is selected from the group consisting of ditetrazolylamine, 5,5'-hydrazotetrazolyl, and 1,3-ditetrazolyltriazene.
7. The method of claim 1 wherein the tetrazine derivative is selected from the group consisting of diaminotetrazine and dihydrazinotetrazine.
8. The method of claim 1 wherein the guandine derivative is nitroaminoguanidine.
9. A composition comprising a fuel and an oxidizer suitable for use in a thermal laser:
   a. said fuel being at least one selected from the group consisting of a guanidine derivative, a triazine derivative, a tetrazine derivative, a ditetrazolyl derivative, and a tetrazole derivative; and
   b. said oxidizer being at least one selected from the group consisting of a high energy aliphatic polynitro compound and a polynitroamine.
10. The composition of claim 9 wherein the polynitroamine is tetranitroethylenediamine.
11. The composition of claim 9 wherein the aliphatic polynitro compound is selected from the group consisting of tetranitromethane, trinitromethane, and hexanitroethane.
12. The composition of claim 9 wherein the guanidine derivative is nitroaminoguanidine.
13. The composition of claim 9 wherein the triazine derivative is cyanuric acid triazide.
14. The composition of claim 9 wherein the tetrazine derivative is selected from the group consisting of diaminotetrazine and dihydrazinotetrazine.
15. The composition of claim 9 wherein the ditetrazolyl derivative is selected from the group consisting of ditetrazolylamine; 1,3-ditetrazolyltriazene; and 5,5'-hydrazotetrazolyl.
16. The composition of claim 9 wherein the ditetrazolyl derivative has the following structural formula:

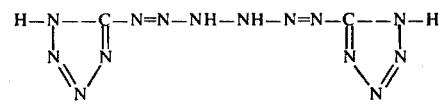

17. The composition of claim 9 additionally including a binder.

* * * * *